No. 618,194. Patented Jan. 24, 1899.
J. THOMSON.
PIPE CONNECTION FOR WATER METERS.
(Application filed Feb. 18, 1898.)
(No Model.)
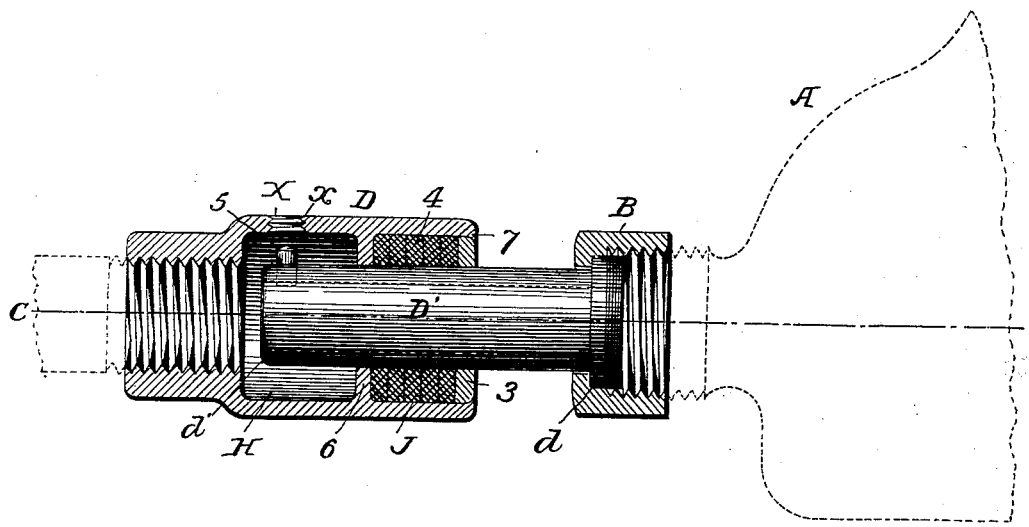

UNITED STATES PATENT OFFICE.

JOHN THOMSON, OF NEW YORK, N. Y., ASSIGNOR TO THE NEPTUNE METER COMPANY, OF JERSEY CITY, NEW JERSEY.

PIPE CONNECTION FOR WATER-METERS.

SPECIFICATION forming part of Letters Patent No. 618,194, dated January 24, 1899.

Application filed February 18, 1898. Serial No. 670,841. (No model.)

*To all whom it may concern:*

Be it known that I, JOHN THOMSON, a citizen of the United States, residing at New York, (Brooklyn,) Kings county, State of New York, have invented certain new and useful Improvements in Pipe Connections for Water-Meters, of which the following is a specification.

This invention relates to pipe connections for water-meters and like apparatus, and has for its object to provide a simple, cheap, and effective connection whereby the necessity of cutting the pipe to an exact measurement is avoided and the loss of time in adjusting the same to the meter is saved, while the meter or other device connected to it is freed from the danger of overstraining, which frequently occurs when fixed connections are employed; and to these ends my invention consists in a pipe connection having the features of construction and arrangement substantially as hereinafter more particularly set forth.

In the accompanying drawing is shown a pipe connection, partly in section, sufficient to illustrate its construction and application to one of the purposes for which it is designed.

In the drawing, A indicates in dotted outline a portion of a water-meter or other device to be connected with a pipe C, also indicated in dotted lines, which may be the source of supply or discharge to the meter. Interposed between the pipe and meter or other device is the connection. This connection consists, essentially, of two parts, one, D, of which is in the form of a slip-sleeve and is adapted to be connected to the pipe C, and the other, D', a union sleeve or pipe adapted to be connected to the meter or other device, as by means of an ordinary union-nut B. The slip-sleeve D is provided with two chambers H and J, separated by a rib 6. In the chamber J is placed the packing material, which is shown as in the form of washers of plastic packing, and these are secured in the chamber by means of an outer ring 3, preferably of metal, which is held in place by any suitable device, as by spinning over or upsetting the metal edge 7 of the slip-sleeve.

The union-sleeve D' is provided at one end with a flange $d$, by means of which it is coupled to the meter by the union-nut B, and the opposite end $d'$ is preferably rounded slightly at its edge, so that in assembling the parts this union-sleeve D' can be passed through the packing 4, which is thus compressed, insuring a tight joint. The sleeve is also provided with a stop near its end $d'$, (shown in the form of a pin 5,) and this is preferably applied either by passing it through the screw-threaded end of the slip-sleeve D or through the opening $x$ in the wall of the chamber H, which opening may afterward be closed by the plug X. The pin when in position serves to limit the movement of the union-sleeve D' in the slip-sleeve D, although allowing the two to move with relation to each other to the extent of the length of the chamber H less the diameter of the pin, and prevent the parts from being separated or blown off by water-pressure or otherwise, while permitting them to be adjusted in setting or allowing them to move with relation to each other to accommodate for expansion or otherwise, avoiding strain upon the meter.

It will be seen that this construction is exceedingly simple and cheap, that it furnishes a substantial coupling that is easily and readily packed to avoid leakage, and can be readily connected and disconnected, and otherwise fully answers all the requirements of such a device.

What I claim is—

1. A pipe connection comprising two parts movable longitudinally relative to each other, one of said parts extending into the other and being provided with a detachable stop for limiting the relative movement of the parts and the other of said parts being provided in its side with an opening and means for closing the same, substantially as described.

2. A pipe connection comprising a slip-sleeve having chambers, an intermediate rib and a plug, a union-sleeve mounted therein and having a pin at one end entering one of the chambers of the slip-sleeve, packing mounted in the other chamber, a metallic ring for holding the packing in place, the ring being secured by upsetting the edge of the slip-sleeve, substantially as described.

3. A pipe connection comprising a slip-sleeve having means for attaching it to a pipe and provided with a plug and with two chambers separated by an intermediate rib, a union-sleeve mounted in said slip-sleeve and provided with a pin at one end and a flange at the other, a union-nut mounted on the union-sleeve, packing interposed between the slip-sleeve and union-sleeve in one of the chambers, and means for holding said packing in place, substantially as described.

In testimony whereof I have signed my name to this specification in the presence of two subscribing witnesses.

JOHN THOMSON.

Witnesses:
  HELEN BLANCHFIELD,
  GEO. L. DE FRANCE.